Sept. 1, 1942.  H. S. JANDUS  2,294,667
BRAKE LEVER
Filed April 15, 1940  3 Sheets-Sheet 2
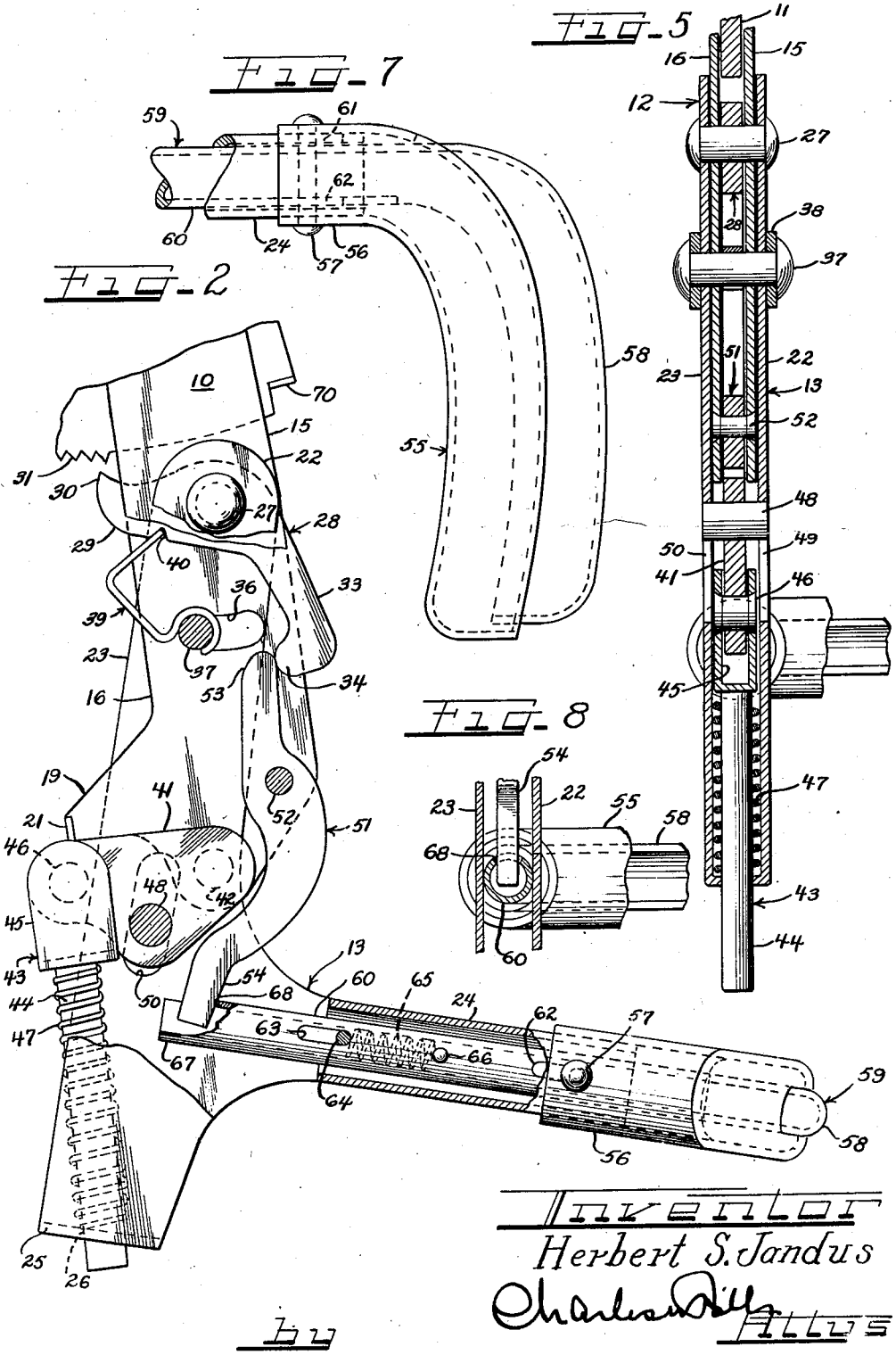
Inventor
Herbert S. Jandus
by Charles ... Attys Sept. 1, 1942.  H. S. JANDUS  2,294,667
BRAKE LEVER
Filed April 15, 1940   3 Sheets-Sheet 3
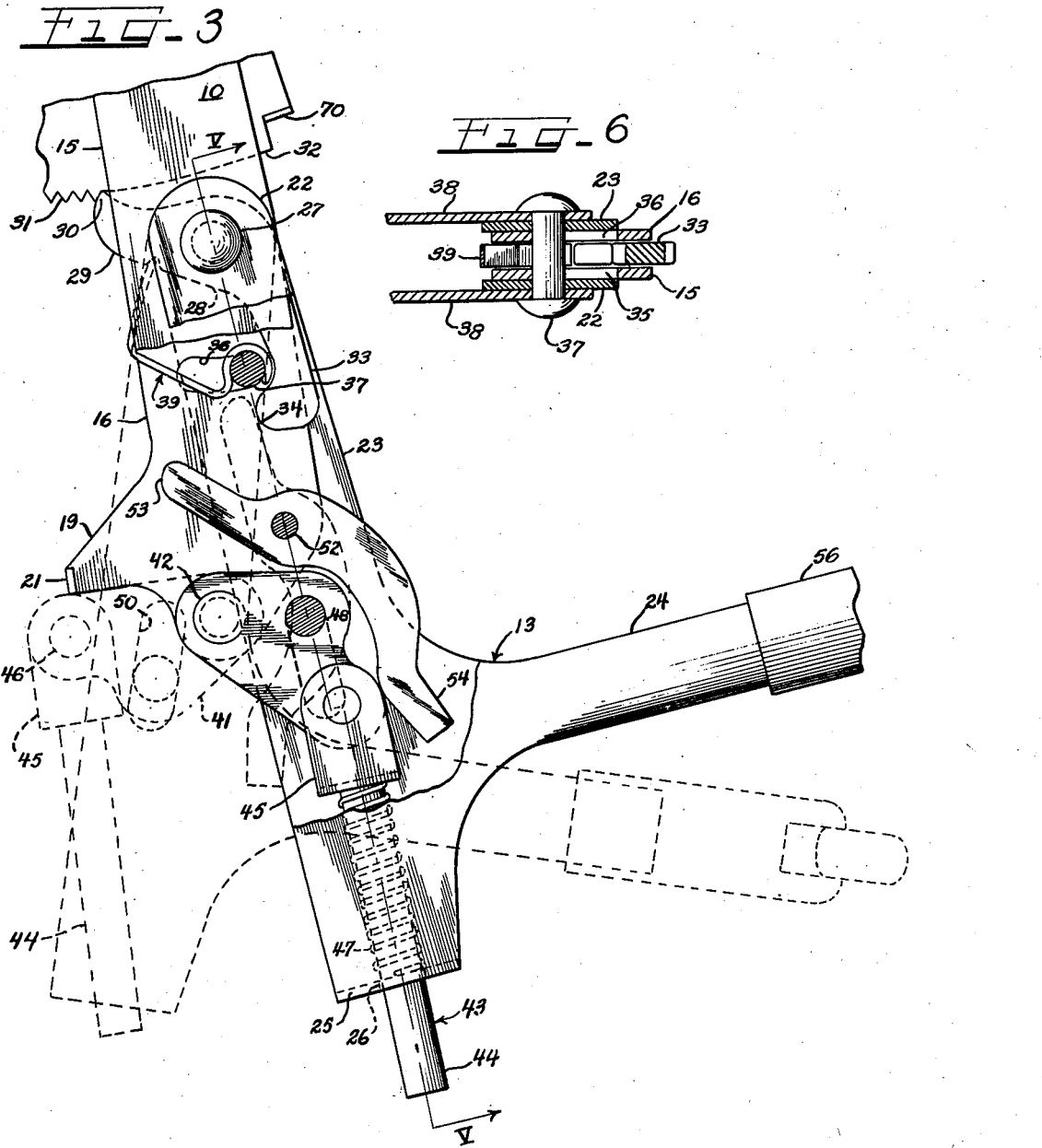
Inventor
Herbert S. Jandus
by Charles ??? Attys Patented Sept. 1, 1942

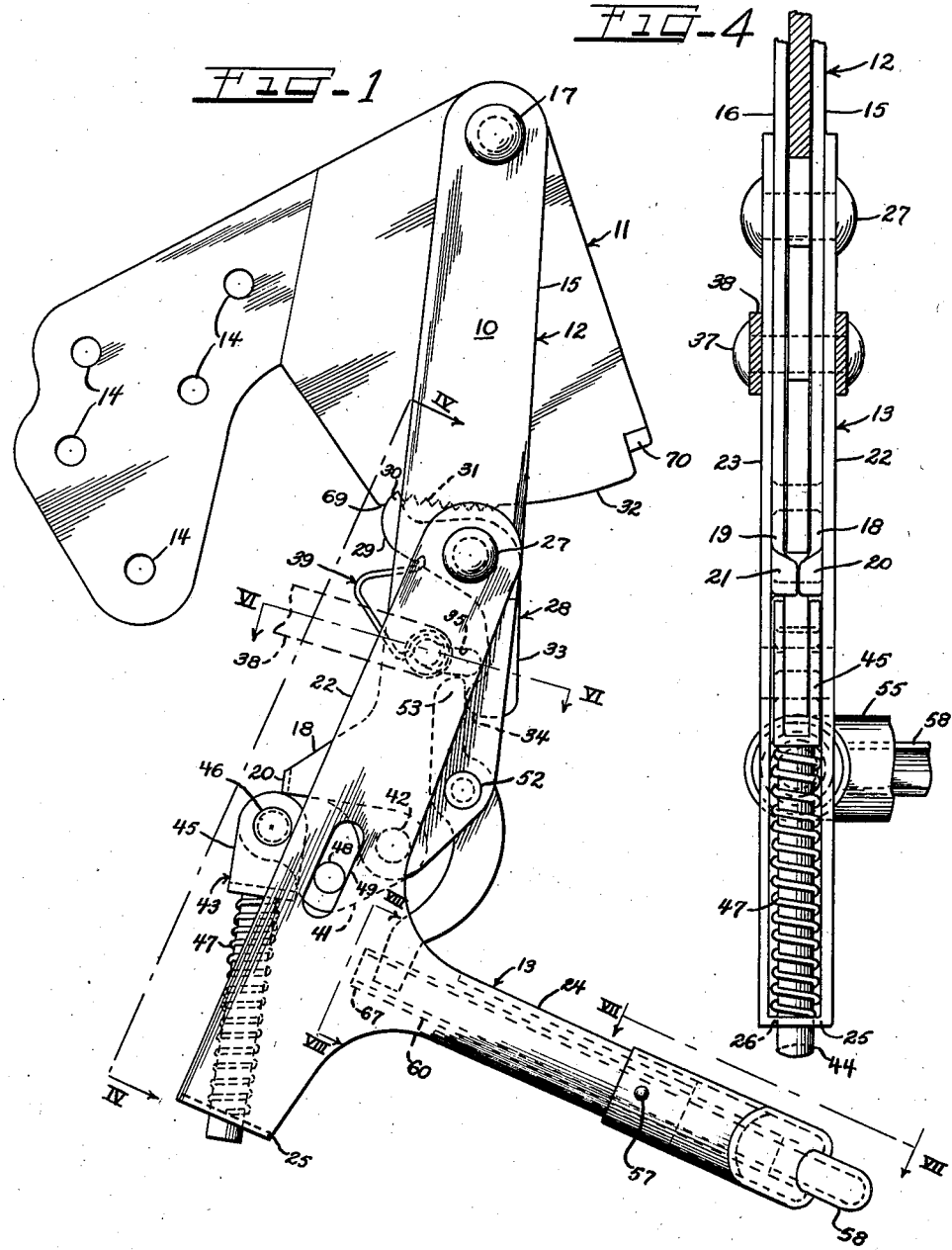

2,294,667

UNITED STATES PATENT OFFICE 2,294,667

BRAKE LEVER

Herbert S. Jandus, Detroit, Mich., assignor to Houdaille-Hershey Corporation, Detroit, Mich., a corporation of Michigan Application April 15, 1940, Serial No. 329,616

16 Claims. (Cl. 74—516)

The present invention relates to a novel brake lever construction of the dash type, and more particularly to a jointed brake lever construction having variable ratios which automatically change from a low ratio to a much higher ratio when the operative force necessary to move the member being actuated reaches a predetermined value.

Heretofore, in brake levers of the dash type, it has been necessary for the operator to apply a progressively increased force on the lever to actuate the brakes from a fully released position to a fully actuated position. This was due entirely to the fact that such brake levers were provided with but a single operating ratio of operative force applied by the operator to tension load exerted by the brakes and the linkage mechanism.

According to this invention, an efficient brake lever construction is effected which initially provides a low reduction in the operating leverage ratio until the brake shoes engage the brake drums and thereafter automatically changes to a much higher reduction in the operating leverage ratio to actually apply the brakes when a predetermined value of the operative force necessary to apply the brakes is reached.

It is, therefore, an important object of this invention to provide an improved brake lever construction having operating leverage ratios which automatically change from one ratio to a higher ratio when the force necessary to move the actuating lever reaches a predetermined value.

Another object of the present invention is to provide a brake lever construction having variable operating leverage ratios which is simple in construction, durable, and efficient in use.

A further object of the present invention is to provide a two-part hinged brake lever construction capable of being actuated as a unitary lever through a portion of the total movement of the lever construction necessary in actuating or releasing the brakes, with one of the lever parts being capable of moving alone through the balance of the total movement.

A still further object of this invention is to provide a two-part hinged brake lever construction capable of being partially actuated as a unitary lever and which is held in adjusted position by a cooperating pawl and ratchet, with one of the lever parts being capable of movement relative to the other lever part and which is held in its adjusted position by a toggle linkage mechanism.

Another and still further object of this invention is the provision of a brake lever construction having a swinging lever connected to a support by a preloaded toggle linkage, the swinging lever and toggle linkage being arranged to allow the lever to swing in either direction when the toggle linkage is in any but one position.

Still another object of this invention is the provision of a two-part hinged brake lever construction being operatively connected by a toggle linkage normally rendering the lever parts free for relative movement within predetermined limits, one of the lever parts being held in adjusted position at one of its swinging limits when the toggle linkage is in an angular position in reverse of its position when the lever part was at its other swinging limit.

Another object of this invention is the provision of a brake lever construction having pivoted lever parts capable of being operated as a unitary lever or for relative movement between the lever parts in one direction with means for separately holding the lever parts in adjusted position, and also having novel release means for releasing the lever parts from adjusted position to render them movable in the opposite direction.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawings, in which:

Figure 1 is a view in side elevation of a brake lever construction embodying the principles of this invention;

Figure 2 is an enlarged fragmental view similar to Figure 1, with portions broken away and parts shown in vertical cross section, illustrating the position of parts at the end of the unitary lever movement and with the release mechanism holding the pawl out of engagement with its cooperating sector;

Figure 3 is a fragmental view similar to Figure 2 illustrating, in dotted lines, the relative position of parts at the end of the unitary lever movement and, in full lines, the relative position of parts when the lower brake lever member has been moved to a fully actuated braking position;

Figure 4 is a longitudinal fragmentary edge view, partially in elevation and partially in angular section, taken substantially in the plane indicated by the line IV—IV of Figure 1;

Figure 5 is a longitudinal cross-sectional view, with parts in elevation, taken substantially in the planes indicated by the general longitudinal line V—V of Figure 3;

Figure 6 is an enlarged transverse cross-sectional view, with parts in elevation, taken substantially in the plane indicated by the line VI—VI of Figure 1;

Figure 7 is an enlarged fragmentary plan view as seen looking in the direction of the arrows along the line VII—VII of Figure 1; and Figure 8 is an enlarged fragmentary end view, with parts in vertical section, taken substantially in the plane indicated by the line VIII—VIII of Figure 1.

In the general embodiment of the present invention as illustrated in the drawings, there is disclosed a brake lever construction 10 of the "dash type," that is, a lever which is pivoted behind the instrument board of an automotive vehicle having a grip portion projecting below and beyond the instrument board.

Generally speaking, the brake lever construction 10 includes a mounting plate or bracket 11, an upper brake lever member 12 which is pivotally connected to the bracket 11, and a lower lever member 13 having pivotal connection to an intermediate portion of the upper lever member 12.

As best shown in Figure 1, the mounting plate or bracket 11 is fashioned of flat metal stamped to proper size and form and is provided with apertures or bolt holes 14 whereby it is secured in place behind a vehicle instrument board (not shown).

The upper brake lever member 12 consists of a pair of flat metal plates or legs 15 and 16 which straddle the supporting bracket 11 and hang in pivotal depending relation therefrom by a pivot pin 17. The legs 15 and 16 are provided with laterally extending portions 18 and 19 which terminate in inwardly extending abutments 20 and 21, as shown in Figures 1 and 4.

The lower brake lever member 13 is generally T-shaped in side elevation, having spaced parallel legs 22 and 23 forming one of its T-legs and a tubular handle 24 extending angularly from the spaced legs to form the other T-leg. At their lower ends, the legs 22 and 23 of the lower lever member 13 are joined by an end wall 25 which is provided with a centrally located aperture 26 for a purpose to be more fully explained hereinafter. The other ends of the legs 22 and 23 straddle the upper lever member 12 and are pivotally connected thereto by a pivot pin or rivet 27.

An L-shaped pawl 28 is supported by the pivot 27 between the spaced legs of the upper lever member. One of its legs 29 is provided with an upwardly extending tooth portion 30 adapted for engagement with a tooth 31 on the sector formed on the arcuate edge 32 of the bracket 11, which edge is described by a radius struck from the center of the pivot 17. The other angularly extending leg or tail piece 33 extends downwardly and is provided with a laterally extending edge portion 34 for a purpose to be explained more fully hereinafter.

Below the pivot 27 connecting the upper and lower brake lever members, there is provided in the legs 15 and 16 of the upper brake lever member 12 a pair of arcuate slots 35 and 36 whose edges are described by radii struck from the center of the pivot 27. The legs 22 and 23 of the lower lever member 13 are suitably apertured in registry with the arcuate slots 35 and 36 to receive therethrough a rivet 37.

A clevis 38 straddles the lower lever member 13 and is carried by the pivot 37 (Figures 1, 4, 5 and 6) to connect the brake lever construction 10 to the braking mechanism of the vehicle (not shown).

A flat metal spring 39 is formed V-shaped in side elevation with one of its ends seated in a slot 40 provided on the lower edge of the pawl leg 29, and its other end partially bent around the pivot 37 in such a manner as to movably receive the pivot therethrough.

It is to be noted that the spring 39 normally urges the pawl 29 into engagement with a sector tooth 31 irrespective of the position of the pivot 37 within the arcuate slots 35 and 36.

A triangularly shaped link 41 is pivoted at one end to the lower ends of the legs 15 and 16 of the upper lever member 12 by means of a pivot 42.

A load member 43, consisting of a rod 44 and an end clevis 45, is also pivoted to the link 41. The clevis end 45 is pivotally connected to the other end of the link 41 by means of a pivot 46, such as a flat headed rivet as illustrated in Figure 5. The rod 44 extends downwardly through the aperture 26 provided in the end wall 25 at the lower end of the lever member 13. A compression spring 47 embraces the rod 44 and engages at one end with the shoulder of the clevis 45 and its other end engages against the end wall 25. Compression of the coil spring 47 serves to normally urge the link member 41 in a position as shown in Figure 1.

At the apex of the link 41, there is provided a stationary pin 48 which extends laterally from the side surfaces of the link (Figure 5). Longitudinally extending slots 49 and 50 are provided in the legs 22 and 23 of the lower lever member 13 to slidingly receive the ends of the pin 48 (Figures 1, 2 and 5).

A release lever 51, of flat metal of the same thickness as the pawl 28 and the link 41, is pivoted to and between the legs 15 and 16 of the upper lever member by means of a flat headed rivet 52, as best shown in Figures 2 and 5. The upper end 53 of the release lever is positioned to make edge engagement with the lateral extension 34 of the pawl when the release lever is rocked about its pivot 52. When so rocked, the pawl 28 is swung out of engagement with a ratchet tooth 31 by overcoming compression of the pawl spring 39. The lower end 54 of the release lever extends downwardly below the link 41 when the parts are positioned as shown in Figures 1 and 2.

At the end of the tubular portion 24 of the lever member 13, there is provided a curved handle 55 of U-shape in cross section for a major portion of its length. The handle terminates in a tubular portion 56 which embraces the end of the tubular leg of the lower lever member 13 and is fixedly connected thereto by means of a rivet 57. The curved U-shaped portion of the handle 55 receives in nested relation therewith a similarly shaped end 58 of a clutch release member 59.

A clutch or pawl release member 59 has a tubular portion 60 arranged for endwise movement within the tubular leg 24 of the lower lever member 13. A pair of opposed axially extending slots 61 and 62 are provided in the tubular portion 60 for receiving therethrough the rivet 57 for limiting the endwise movement of the clutch release member 59 (Figures 2 and 7).

Similar slots 63 (Figure 2) are provided in the tubular portion 60 of the clutch release member adjacent its free end to receive therethrough a small pin 64 which extends through the tube 24 of the lower lever member, the slots and pins coacting to serve as a guide for the free end of the clutch release member 59 and also to provide an abutment for an end of a coil spring 65. The opposite end of the coil spring 65 abuts against a pin 66 which extends through the side walls of the tubular portion 60 of the clutch release member. Compression of the spring 65 normally serves to urge the clutch release member 59 in a projected operative position. As illustrated in Figure 2, the spring 65 has been compressed by actuation of the handle portion 58.

At its inner free end 67, the tubular portion 60 of the clutch release member 59 is provided with a slot 68 (Figures 2 and 8) into which extends the lower end 54 of the release lever 51. As best shown in Figure 2, endwise movement of the clutch release member 59 serves to rock the release lever about its pivot and in turn rock the pawl 28 out of engagement with its cooperating sector.

The operation of the device will now be explained. The brake lever construction illustrated in Figure 1 is in a fully brake released position, the upper lever member 12 being held at one limit of its swinging movement by abutment between the tooth 30 of the pawl and a stop portion 69 provided on the arcuate edge of the supporting bracket 11. It is to be noted that the limit of swinging movement for the lever 12 in the opposite direction is provided for by a stop 70 formed by transversely bending the corner of the supporting bracket 11. With the parts in this position, the load member 43 is positioned at the extreme left and compression of the coil spring 47 serves to maintain the upper and lower brake lever members in a locked unitary arrangement.

By grasping the handle 55, which is disposed crosswise of the vehicle in order to conserve leg room, and pulling the unitary lever to the right or in a brake actuating direction the brakes are actuated through movement of the clevis 38, which connects the brake linkage mechanism to the lower lever member 13. In this movement, the unitary lever is swung about the upper or supporting bracket pivot 17 and the pawl 28 ratchets over the teeth 31.

When brake tension as exerted through the clevis 38 is such that the pull on the handle 55 is greater than compression of the spring 47, the latter compresses to allow for relative movement of the lower lever member while the upper lever member is being held in adjusted position by cooperation between the pawl 28 and a sector tooth 31.

As the lower lever member 13 swings on its pivot 27, the pivot 37 slides from one end of the arcuate slots 35 and 36 to their opposite ends while at the same time the spring 39 maintains the pawl 28 in cooperation with its sector. In this manner, the limit of relative movement of the lower lever to the upper lever is defined by the length of the slots 35 and 36.

Continued movement to the right, from a position as shown in dotted lines to a position as shown in full lines in Figure 3, serves to fully actuate the brakes by displacement of the pivot pin 37 which carries the brake linkage clevis 38 from one end to the other of the arcuate slots 35 and 36. During this movement, the triangular link 41 reverses itself about the pivot 48 which moves longitudinally in the slots 49 and 50 until the pivots 42 and 48 are on or near dead center alignment. Compression of the spring 47 serves to hold the pivots in this alignment thereby restraining the lower lever member 13 from movement to the left or in a brake releasing direction.

It is to be noted that the upper and lower lever members move as a unitary lever from their position as shown in Figure 1 to a position as shown in dotted lines of Figure 3. This initial movement serves the purpose of taking up all slack in the brake linkage mechanism while the unitary lever is being operated at a low reduction of operative effort to brake tension. It has been found that this leverage ratio can be as low as 2 to 1, but, it is to be understood that this leverage ratio may be increased or decreased depending upon the operative lever lengths desired.

In the secondary movement, illustrated in Figure 3 between the position of parts shown in dotted lines and the position of parts shown in full lines, when the lower lever member 13 swings about its pivot pin 27, a much higher reduction of operative effort to brake tension is automatically effected which was found to be 6 to 1, and, which can also be varied as desired.

To release the lever mechanism for movement to the left or in a brake releasing direction, the operator squeezes his grip to urge the curved handle 58 into the handle 55 and pushes forwardly thereon. When the parts assume the relationship as shown in dotted lines in Figure 3, or at the end of the relative movement of the lower lever member 13, the upper end 53 of the release lever 51 which is rocked about its pivot engages the tail-piece 33 of the pawl to rock the pawl out of its engagement with a sector tooth 31. Continued movement to the left by a pushing action then serves to rock the unitary lever about its pivot 17 to a fully brake released position, as shown in Figure 1. It is to be understood, of course, that when the parts assume the position as shown in dotted lines of Figure 3, the link and load member again cooperate to hold the upper and lower lever members in locked position for movement as a unitary lever in a brake releasing direction.

It will be seen from the foregoing description that the present invention contemplates a brake lever construction of pivoted lever members, both capable of being partially actuated as a unitary lever having a low leverage ratio and being further partially actuated by one of the lever members swinging alone at an increased leverage ratio. The automatic change-over from the low leverage ratio to the high leverage ratio takes place as soon as the operative force necessary to actuate the lever mechanism reaches the compression of the coil spring which normally serves to hold the two lever members in a unitary locked position. By properly increasing or decreasing the compression value of the coil spring, the automatic change between leverage ratios can be effected at any point desired in the movement of the brake lever members from a fully released position to a fully actuated position.

While a particular embodiment only of this invention has been illustrated, it will, of course, be understood that the invention should not be limited thereto, since many modifications may be made and, therefore, it is contemplated by the appended claims to cover all such modifications as fall within the true spirit and scope of the present invention.

I claim as my invention:

1. A brake lever construction comprising pivoted lever members, means operatively connecting said lever members for unitary movement when an actuating force required to move them is less than a predetermined value, said means including means movable for disconnecting said unitary arrangement whereby one of said lever members is movable relatively to the other of said lever members in the same direction as said unitary movement when said other lever is stationary and said actuating force is greater than the predetermined value, said first means including said second means coacting to hold said one lever member in adjusted position only when said relative movement has reached its limit.

2. A brake lever construction comprising a support, an upper lever member pivoted to said support, cooperating clutching members adapted for holding said upper lever member in adjusted position, a lower lever member pivoted to said upper lever member, and connecting means for holding said lever members together for unitary movement when in one angular position relative to and on one side of the longitudinal axis of said lower lever member, said means when in a reverse angular position relative to and on the other side of the longitudinal axis of said lower lever member holding said lower lever member in adjusted position.

3. A brake lever construction comprising a support, an upper lever member pivoted to said support, cooperating clutching members adapted for holding said upper lever member in adjusted position, a lower lever member pivoted to said upper lever member, a link operatively connecting said lever members, and resilient means associated with said link and arranged to normally hold said lever members together for unitary movement when the actuating force required to move them is less than a predetermined value, said resilient means permitting said lower lever member to move relatively to said upper lever member when said actuating force is greater than the predetermined value, said link and resilient means cooperating to hold said lower lever member in adjusted position only at the limit of said relative movement.

4. A brake lever construction comprising a support having a sector on an edge thereof, a lever pivotally mounted on said support, a pawl carried by said lever and arranged to engage with said sector to hold said lever in an adjusted position, a second lever pivotally mounted on said first lever coaxially with said pawl and arranged for connection to a brake setting member, said second lever being arranged for manual actuation, a compression coil spring arranged to normally hold said levers in fixed angular position with respect to each other when in one angular position, said coil spring being rendered ineffective to hold said levers in relatively fixed angular position when the brake applying force exceeds a predetermined value whereby the fulcrum point of said second lever is shifted from the pivotal mounting of the first lever on said support to the pivotal mounting of said second lever on said first lever to change the leverage ratio, said compression spring arranged to hold said second lever in adjusted position at the end of said relative movement, and release means carried by said second lever for rocking said pawl out of engagement with said sector.

5. A brake lever construction comprising a support having an edge formed as a ratchet, an upper lever member pivoted to said support, a pawl carried by said upper lever member and arranged to engage with said ratchet for holding said lever member in adjusted position, a lower lever member pivoted to said upper lever member, and a link having one end pivotally connected to said upper lever, said link having its other end and intermediate portion between said ends operatively connected to said lower lever, said link when in one angular position relative to said lever members arranged to hold said lever members for unitary movement and when in a reverse angular position thereto being arranged to hold said lower lever member in adjusted position, said lower lever member being arranged for free movement relative to said upper lever member when said link is in any angular position between said holding positions.

6. A brake lever construction comprising a support having an edge formed as a ratchet, an upper lever pivoted to said support, a pawl carried by said upper lever and arranged to engage with said ratchet for holding said lever in adjusted position, a lower lever pivoted to said upper lever, a link having one end pivotally connected to said upper lever, a compression load member operatively connecting the other end of said link and lower lever, said link being connected to said lower lever to permit rotational movement and limited longitudinal movement therebetween, said load member arranged to hold said levers together for unitary movement when the actuating force required to move them is less than the compression of said load member, said load member being further arranged to permit said lower lever to move relatively to said upper lever when said actuating force is greater than the compression of said load member, said link and load member cooperating to hold said lower lever in adjusted position only when at either limit of movement relative to said upper lever, and means for releasing said levers from adjusted holding positions.

7. A brake lever construction comprising a support having an edge formed as a ratchet, an upper lever pivoted to said support, a pawl carried by said upper lever and arranged to normally engage said ratchet for holding said lever in adjusted position, means for normally maintaining said pawl and ratchet in engagement, a lower lever of T-shape having an end of one of its legs pivoted to said upper lever and an end of its other leg shaped as a handle, means limiting the relative movement between said levers, a link pivotally connected at one end to said upper lever, a load member having a pivotal connection to the other end of said link and a guide portion operatively connected to said lower lever, said link being further operatively connected to said lower lever to permit limited rotational and longitudinal movements therebetween, a compression spring carried by said load member and interposed between an end thereof and a portion of said lower lever, said spring holding said levers together for unitary movement when a pulling force applied to the handle and required to move them is less than the compression of said spring, said spring permitting said lower lever to move relatively to said upper lever when said pulling force is greater than the compression of said spring, said link, spring and load member cooperating to hold said lower lever in adjusted position only when said lower lever is at either limit of relative movement to said upper lever, and release means operative at said handle and operatively engaging said pawl to release said levers from adjusted holding position when a pushing force is applied to said handle.

8. A resilient operative connection for pivoted levers comprising a triangularly shaped link, a load member being pivotally connected to one apex of said link, another apex of said link being arranged for pivotal connection to one of the pivoted levers, and a compression spring interposed between said load member and another of the pivoted levers, the third apex of said link being arranged for operative connection to the last mentioned lever to permit limited rotational and longitudinal movements therebetween, said compression spring being adapted to hold the levers together for unitary movement when an actuating force required to move them is less than a predetermined value and permitting relative movement therebetween when the actuating force is greater than said predetermined value.

9. A brake lever construction for actuating brakes comprising pivoted lever members, means for operatively connecting said lever members and being movable between predetermined limits, said means when at one movable limit connecting said lever members for unitary movement in one direction to partially actuate the brakes, clutch means cooperating with one of said lever members to hold both members at any adjusted position during said unitary movement, said connecting means when moved from said one limit disconnecting said unitary arrangement whereby the other of said lever members is movable alone in the same direction as the unitary movement and when said one lever member is held stationary to fully actuate the brakes, said connecting means when moved to the other of said limits cooperating with both lever members for holding said other lever member in its adjusted position.

10. A brake lever construction comprising a support, an actuated lever, a pivot mounting said lever on said support, an actuating lever, a pivot mounting said actuating lever on said actuated lever, a compression coil spring normally positioned on one side of the longitudinal axis of one of said levers to hold both levers in fixed angular position with respect to each other, means for holding said actuated lever in an adjusted position with respect to said support, said coil spring being rendered ineffective to hold said levers in relatively fixed angular position when the actuating force exceeds the compression of said spring whereby said spring is rocked to a position on the other side of said lever axis and the fulcrum point of said actuating lever is shifted from said first pivot to said second pivot to change the leverage ratio.

11. An operative connection for pivoted levers comprising a link, a fulcrum on said link operatively connecting a portion of said link and one of said levers and being displaceable along an axis of said one lever, a pivot adjacent said fulcrum connecting said link and the other of said levers, and a load member adjacent said fulcrum on the side opposite said pivot for operatively connecting another portion of said link to said one lever, said load member being rocked between predetermined limits around said fulcrum from one side thereof to the opposite side thereof when one of said levers is moved relative to the other, said load member coacting with said link to hold said levers locked together when at either of said limits, with one of said levers being movable relative to the other when said load member is in any position between said limits.

12. An operative connection for pivoted levers comprising a link, a pivot connecting said link to one of said levers, an additional pivot connecting said link to the other of said levers, a load member operatively connecting said link to one of said levers, said load member and one of said pivots being rocked about the other of said pivots between definite limits when one of said levers is moved relative to the other of said levers, and said load member coacting with said link to hold said levers locked together when at either of said limits.

13. A brake lever construction comprising levers, one of said levers being pivoted to a support to swing, cooperating clutching members for holding said one lever in an adjusted position, the other of said levers being pivoted to said one lever, means for locking said levers together for unitary movement, said means being movable for unlocking said levers whereby said other lever is movable relative to said one lever, an endwise movable release member in spaced relation from said clutching members, a release lever operatively connecting said release member and one of said clutching members when said levers are locked together for unitary movement, and said release lever rocking said one clutching member out of cooperation with the other of said clutching members only when said levers are locked together for unitary movement and said release member is moved in one endwise direction.

14. A lever construction comprising levers, one of said levers being pivoted to a support to swing and the other of said levers being pivoted to said one lever for actuating the latter, and pressure exerting means operatively connecting said levers together and being normally positioned to exert pressure on one side of the longitudinal axis of one of the levers to fixedly hold them together, said means being rendered ineffective to hold the levers together when the actuating force applied to said other lever exceeds the pressure of said means whereby said means is moved to a position to exert pressure on the other side of said longitudinal axis.

15. A brake lever construction comprising a plurality of lever members, one of said lever members being pivoted to a support and another of said lever members being pivoted to said one lever member, cooperating clutching members for holding said one lever member in an adjusted position to which it is swung, and pressure exerting means operatively connecting said lever members together and being movable between limits from one side of the axis of one of the lever members to the other side thereof, said means when at a limit of movement on either side of said axis fixedly holding the lever members together and when in any position between said limits of movement rendering said other lever free for movement relative to said one lever.

16. A brake lever construction comprising lever members, one of said lever members being pivoted to a support to swing, means for limiting the swinging movement of said one lever member, the other of said lever members being pivoted to said one lever member to swing relative thereto, and means operatively connecting said lever members together and normally exerting pressure on one side of the longitudinal axis of one of the lever members for fixedly holding them together for unitary movement, said means being rendered ineffective to permit said other lever to swing relative to said one lever when force to swing said other lever is greater than the pressure exerted by said means whereby said means is moved to a position to exert pressure on the other side of said longitudinal axis.

HERBERT S. JANDUS.